United States Patent
Shiga et al.

(10) Patent No.: US 11,155,270 B2
(45) Date of Patent: Oct. 26, 2021

(54) DRIVING EVALUATION APPARATUS, DRIVING EVALUATION SYSTEM, AND DRIVING EVALUATION METHOD

(71) Applicant: TOYOTA JIDOSHA KABUSHIKI KAISHA, Toyota (JP)

(72) Inventors: Takahiro Shiga, Chiryu (JP); Mami Kato, Toyota (JP); Masato Endo, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 203 days.

(21) Appl. No.: 16/532,549

(22) Filed: Aug. 6, 2019

(65) Prior Publication Data
US 2020/0094845 A1    Mar. 26, 2020

(30) Foreign Application Priority Data
Sep. 21, 2018    (JP) .............................. JP2018-178105

(51) Int. Cl.
*B60W 40/09*    (2012.01)
*G05D 1/00*    (2006.01)
(Continued)

(52) U.S. Cl.
CPC ........... *B60W 40/09* (2013.01); *G05D 1/0088* (2013.01); *G07C 5/008* (2013.01); *G07C 5/0841* (2013.01); *G05D 2201/0213* (2013.01)

(58) Field of Classification Search
CPC .. B60W 40/09; B60W 2556/45; B60W 50/14; B60W 60/00253; G05D 1/0088;
(Continued)

(56) References Cited

U.S. PATENT DOCUMENTS 10,464,577 B1 * 11/2019 Shannon .............. G05D 1/0088
2018/0365740 A1 * 12/2018 Nix .................... B60W 60/0013
(Continued)

FOREIGN PATENT DOCUMENTS

| JP | 2016-126490 A | 7/2016 |
| JP | 2018-055538 A | 4/2018 |
| JP | 2018-077658 A | 5/2018 |

OTHER PUBLICATIONS

Toyota Motor Corporation; "Mobility Service-specific EV 'e-Palette Concept'"; Jan. 8, 2018; <https://newsroom.toyota.co.jp/jp/corporate/20508200.html>.

*Primary Examiner* — Michael J Zanelli
(74) *Attorney, Agent, or Firm* — Oliff PLC

(57) ABSTRACT

A driving evaluation apparatus includes: a communication device configured to be able to communicate through a network with at least one of a vehicle-mounted device installed in a vehicle that is under automatic driving control and a mobile terminal of a passenger who is riding in the vehicle; and a processor configured to send a signal for displaying a query for evaluating the driving of the vehicle on at least one of the vehicle-mounted device and the mobile terminal to at least one of the vehicle-mounted device and the mobile terminal by controlling the communication device, and receive a reply to the query from the passenger from at least one of the vehicle-mounted device and the mobile terminal by controlling the communication device.

7 Claims, 7 Drawing Sheets

(51) Int. Cl.
*G07C 5/00* (2006.01)
*G07C 5/08* (2006.01)

(58) Field of Classification Search
CPC .......... G05D 2201/0213; G07C 5/0841; G07C 5/008; G07F 17/0057
See application file for complete search history.

(56) References Cited

U.S. PATENT DOCUMENTS

| | | | |
|---|---|---|---|
| 2019/0047584 A1* | 2/2019 | Donnelly | ............ B60W 50/085 |
| 2019/0382030 A1* | 12/2019 | Hotson | ........... B60W 60/00253 |
| 2020/0218271 A1* | 7/2020 | Krystek | ............... G05D 1/0221 |
| 2020/0225976 A1* | 7/2020 | Peng | ................... H04L 41/5054 |

* cited by examiner

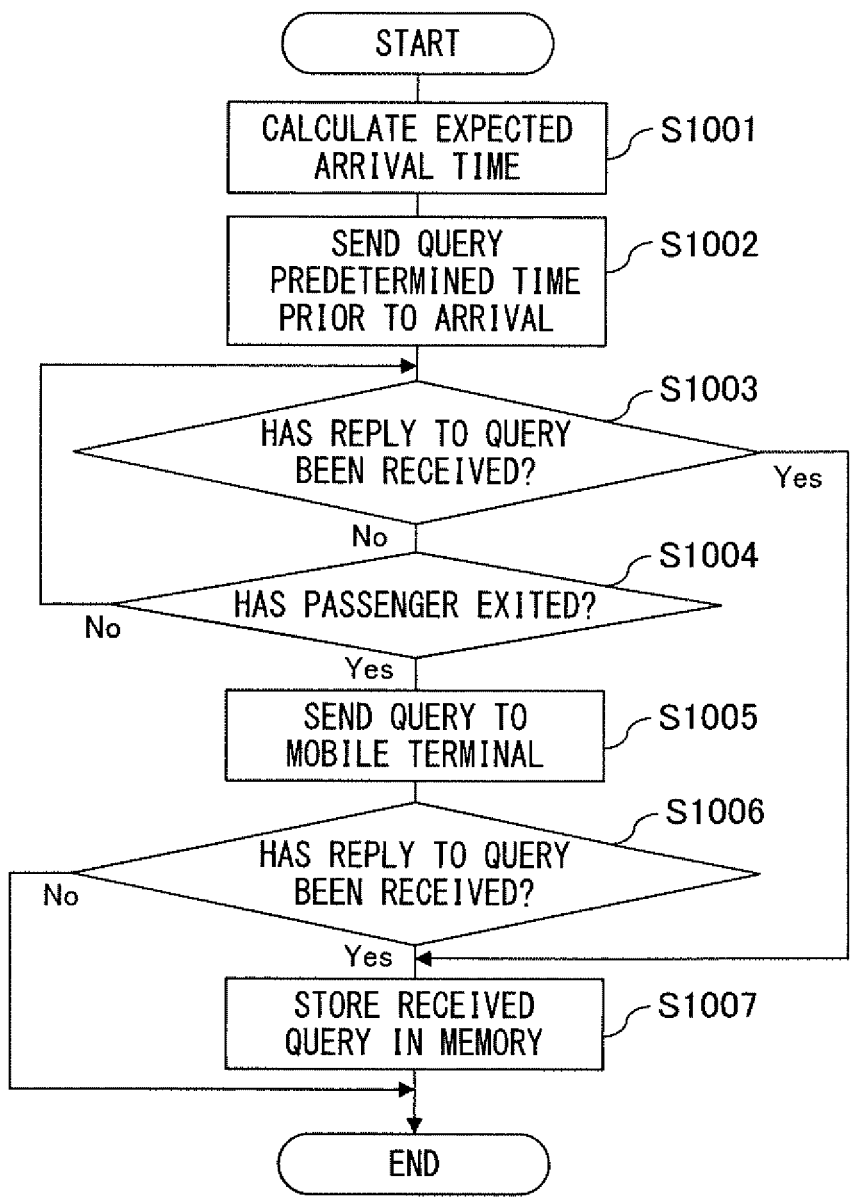

DRIVING EVALUATION APPARATUS, DRIVING EVALUATION SYSTEM, AND DRIVING EVALUATION METHOD

FIELD

The present invention relates to a driving evaluation apparatus, a driving evaluation system, and a driving evaluation method that evaluate the driving of a vehicle that is under automatic driving control.

BACKGROUND

In conventional vehicles driven by drivers, the drivers' driving techniques have profound effects on the ride comfort of the vehicles. It is known that the ride comfort of vehicles experienced by passengers is largely affected by whether or not the passengers are accustomed to temporal variations of acceleration, in addition to the magnitude of acceleration caused by accelerator, brake, or steering wheel operation. Thus, the driving of vehicles that are under automatic driving control is preferably evaluated based on the ride comfort of the vehicles actually experienced by passengers.

For example, in the technique described in Japanese Patent Publication (Kokai) No. 2018-55538, "driver evaluation" is an evaluation of a driver by a passenger, which is made by passengers who have actually ridden in the driver's vehicle. Each time the driver picks up a passenger, the driver evaluation is basically made by the passenger.

In automatic driving vehicles that are under automatic driving control, the performance and function of the automatic driving control have profound effects on the ride comfort of the vehicles. The performance and function of the automatic driving control can be easily updated, as compared to the driving techniques of human drivers, based on evaluations of the driving of the vehicles, in order to further improve the ride comfort of the vehicles experienced by passengers.

For example, a non-patent literature (TOYOTA MOTOR CORPORATION, Mobility Service-specific EV "e-Palette Concept" [retrieved on Aug. 31, 2018], Internet <newsroom-.toyota.co.jp/jp/corporate/20508200> describes an automatic driving vehicle that allows a manufacturer other than the maker of the vehicle to develop an automatic driving kit including vehicle control software and the like, by disclosing a vehicle control I/F (interface) for controlling the driving of the vehicle. In the automatic driving vehicle described in the non-patent literature, the automatic driving kit is configured so that the performance and function of the automatic driving control can be updated. The performance and function of automatic driving control can be thereby optimized in conformance with Mobility-as-a-Service (MaaS).

SUMMARY

However, in automatic driving vehicles in which crew members are absent, it is difficult to request evaluations of the ride comfort of the vehicles from passengers. Therefore, a technology which enables evaluation of vehicles that are under automatic driving control based on ride comfort experienced by passengers has been demanded.

The present invention aims to provide a driving evaluation apparatus which enables evaluation of the driving of a vehicle that is under automatic driving control based on the ride comfort of the vehicle experienced by a passenger.

A driving evaluation apparatus according to an embodiment of the present invention includes a driving evaluation apparatus comprising: a communication device configured to be able to communicate through a network with at least one of a vehicle-mounted device installed in a vehicle that is under automatic driving control and a mobile terminal of a passenger who is riding in the vehicle; and a processor configured to send a signal for displaying a query for evaluating the driving of the vehicle on at least one of the vehicle-mounted device and the mobile terminal to at least one of the vehicle-mounted device and the mobile terminal by controlling the communication device, and receive a reply to the query from the passenger from at least one of the vehicle-mounted device and the mobile terminal by controlling the communication device.

In the driving evaluation apparatus, the processor preferably estimates an expected arrival time when the vehicle is expected to arrive at a destination of the passenger based on a driving route from the present location of the vehicle to the destination of the passenger, and when time difference between the present time and the expected arrival time becomes less than a predetermined time, the processor preferably sends the signal for displaying the query for evaluating the driving of the vehicle to at least one of the vehicle-mounted device and the mobile terminal.

In the driving evaluation apparatus, the processor preferably sends the signal for displaying the query to the vehicle-mounted device, and when the processor receives notification that the passenger has exited the vehicle prior to receiving a reply from the vehicle-mounted device, the processor preferably further sends a signal for displaying the query to the mobile terminal.

In the driving evaluation apparatus, the processor preferably sends a signal for displaying buttons each functioning as both an operation button operated by the passenger to input the reply and an exit button operated by the passenger to open and close a door of the vehicle on at least one of the vehicle-mounted device and the mobile terminal, to at least one of the vehicle-mounted device and the mobile terminal by controlling the communication device.

The driving evaluation apparatus preferably further includes a memory, and the processor preferably stores the reply in the memory in association with information regarding the type or version of an automatic driving control module that is installed in the vehicle and performs automatic driving control on the vehicle.

In the driving evaluation apparatus, the processor preferably sends a signal for displaying queries to at least one of the vehicle-mounted device and the mobile terminal such that each time the passenger uses the vehicle, different queries the number of which does not exceed a predetermined number are displayed.

A driving evaluation system according to an embodiment of the present invention includes a server and at least one of a vehicle-mounted device and a mobile terminal. The server is configured to be able to communicate through a network with at least one of the vehicle-mounted device installed in a vehicle that is under automatic driving control and the mobile terminal of a passenger who is riding in the vehicle. The server sends a signal for displaying a query for evaluating the driving of the vehicle on at least one of the vehicle-mounted device and the mobile terminal to at least one of the vehicle-mounted device and the mobile terminal, and receives a reply to the query from the passenger from at least one of the vehicle-mounted device and the mobile terminal. Upon receiving the signal for displaying the query from the server, at least one of the vehicle-mounted device and the mobile terminal displays the query included in the signal or the query stored in advance in a memory in association with the identification number of the query included in the signal on a display device, and sends the reply to the query, inputted by the passenger by operating an operation device, to the server.

A driving evaluation method according to an embodiment of the present invention includes, by controlling a communication device that is configured to be able to communicate through a network with at least one of a vehicle-mounted device installed in a vehicle that is under automatic driving control and a mobile terminal of a passenger who is riding in the vehicle, the steps of sending a signal for displaying a query for evaluating the driving of the vehicle on at least one of the vehicle-mounted device and the mobile terminal to at least one of the vehicle-mounted device and the mobile terminal, and receiving a reply to the query from the passenger from the at least one of the vehicle-mounted device and the mobile terminal.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

BRIEF DESCRIPTION OF DRAWINGS

FIG. 10 is a flowchart showing an example of a communication control process performed by a communication control unit of the server according to the first embodiment.

DESCRIPTION OF EMBODIMENTS

Figure 1:
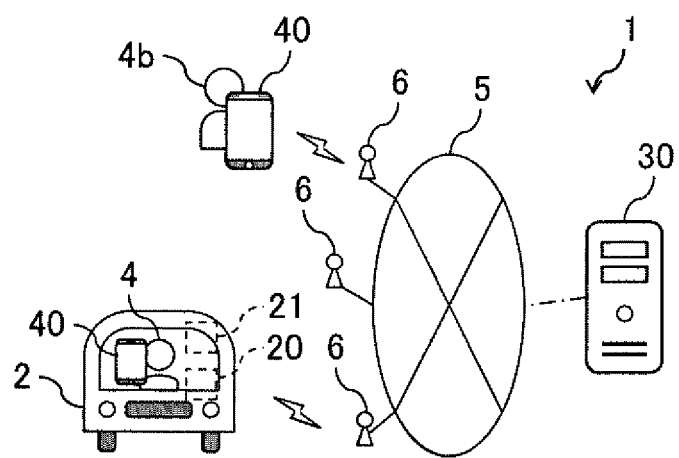
FIG. 1 is a drawing showing an example of the configuration of a driving evaluation system according to a first embodiment.

As described above, the driving of vehicles that are under automatic driving control is preferably evaluated based on the ride comfort of the vehicles actually experienced by passengers. However, in automatic driving vehicles in which crew members are absent, there is a problem in that it is difficult to request cooperation of passengers in surveys for evaluating the driving of the vehicles. Even if it were possible to request cooperation of passengers who have exited the vehicles in surveys such as questionnaires, the cooperation may be burdensome to the passengers, and thus, replies may be untimely or may not be given.

A driving evaluation apparatus according to the present invention includes a communication device that is configured to be able to communicate through a network with at least one of a vehicle-mounted device installed in a vehicle that is under automatic driving control and a mobile terminal of a passenger who is riding in the vehicle. The driving evaluation apparatus sends a signal for displaying a query for evaluating the driving of the vehicle on at least one of the vehicle-mounted device and the mobile terminal to at least one of the vehicle-mounted device and the mobile terminal, by the control of the communication device. The driving evaluation apparatus receives a reply to the query from the passenger from at least one of the vehicle-mounted device and the mobile terminal, by the control of the communication device.

Therefore, the driving evaluation apparatus according to the present invention enables the display of the query for evaluating the driving of the vehicle to the passenger, and the acquisition of the reply to the query from the passenger, even in an automatic driving vehicle in which crew members are absent, whereby the driving of the vehicle that is under automatic driving control can be evaluated based on the ride comfort of the vehicle experienced by the passenger.

A preferred embodiment of the present invention will be described below with reference to the drawings. Note that, the present invention is not limited to the following embodiment, but may be appropriately modified without departing from the gist thereof. In the drawings, components having the same or similar functions are assigned the same reference numerals, and descriptions thereof may be omitted or simplified.

First Embodiment

FIG. 1 is a drawing showing an example of the configuration of a driving evaluation system 1 according to a first embodiment. The driving evaluation system 1 according to the present embodiment has a vehicle-mounted device 20, a server 30, and a mobile terminal 40. The server 30 of the present embodiment is an example of the driving evaluation apparatus.

The vehicle 2 illustrated in FIG. 1 is an automatic driving vehicle that offers mobility services such as taxi, bus, or ride sharing services. The vehicle-mounted device 20 and an automatic driving control module 21 are installed in the vehicle 2. A passenger 4 using the mobility service rides in the vehicle 2. The passenger 4 carries the mobile terminal 40 such as a cellular phone or tablet computer.

The vehicle-mounted device 20 is, for example, a computer having a touch display, and displays a query for evaluating the driving of the vehicle 2 received from the server 30 on the touch display. The vehicle-mounted device 20 obtains a reply to the query, which is inputted by operation of the touch display by the passenger 4 who views the query displayed on the touch display, and sends the reply to the server 30.

The automatic driving control module 21 automatically controls the driving of the vehicle 2. The automatic driving control module 21 is configured such that the performance and function of automatic driving control can be updated.

As with the vehicle-mounted device 20, the mobile terminal 40 has, for example, a touch display and displays a query for evaluating the driving of the vehicle 2 received from the server 30 to the touch display. The mobile terminal 40 obtains a reply to the query, which is inputted by operation of the touch display by the passenger 4 who views the query displayed on the touch display, and sends the reply to the server 30.

The server 30 sends a query for evaluating the driving of the vehicle 2 to at least one of the vehicle-mounted device 20 and the mobile terminal 40, and receives a reply to the query from the passenger 4 from at least one of the vehicle-mounted device 20 and the mobile terminal 40. Thereafter, the server 30 evaluates the driving of the vehicle 2 that is under automatic driving control, based on the received reply.

A user 4b who wishes to use the mobility service offered by the vehicle 2 operates the mobile terminal 40 carried by the user 4b, in order to request the dispatch of the vehicle 2 from the server 30.

The vehicle-mounted device 20, the server 30, and the mobile terminal 40 can communicate with each other through a network 5, which is composed of optical communication lines or the like. The server 30 is connected to the network 5 through, for example, a gateway or the like (not illustrated). The vehicle-mounted device 20 and the mobile terminal 40 are connected to the network 5 through, for example, wireless base stations 6 or the like.

Figure 2:
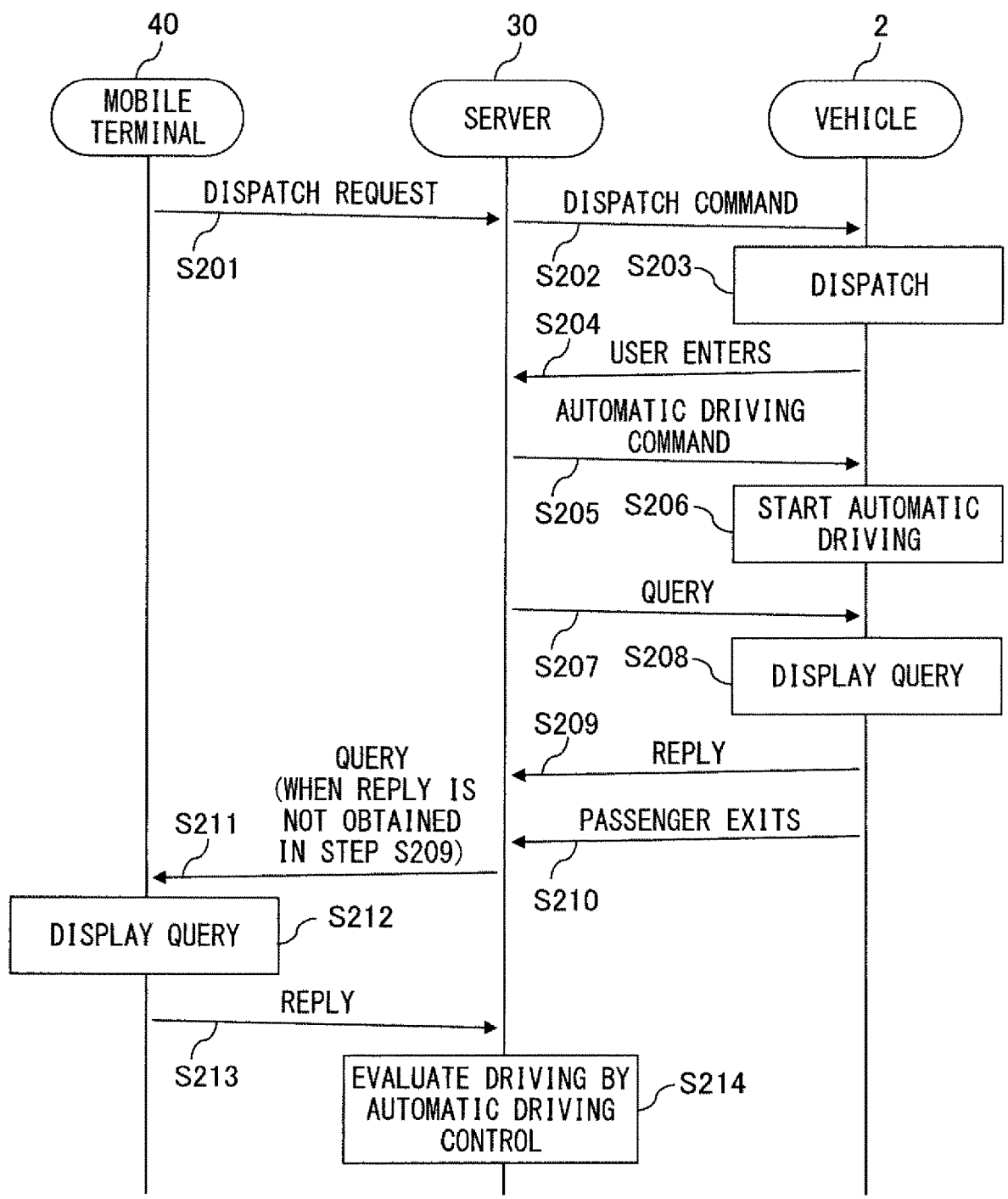
FIG. 2 is a sequence diagram showing an example of a driving evaluation process of a vehicle that is under automatic driving control, in the driving evaluation system according to the first embodiment.

FIG. 2 is a sequence diagram showing an example of a driving evaluation process of the vehicle 2 that is under the automatic driving control, in the driving evaluation system 1 according to the first embodiment. In the sequence diagram of FIG. 2, the server 30, the vehicle 2, and the mobile terminal 40 communicate through the network 5.

The server 30 receives identification information of the user 4b, information regarding the present location of the user 4b and his or her destination, and the like together with a dispatch request, from the mobile terminal 40 of the user 4b who wishes to use the mobility service (step S201). The identification information of the user 4b is, for example, a user number assigned to the user 4b of the mobility service. The present location and destination of the user 4b are designated by, for example, facility names, addresses, or combinations of latitude and longitude.

The server 30 retrieves vehicles 2 that are present within a certain distance from the present location of the user 4b, and selects an available vehicle 2 from the retrieved at least one vehicle 2. The server 30 sends a dispatch command to the vehicle 2 to move the vehicle 2 to the present location of the user 4b (step S202). Note that, when the vehicles 2 offer a ride sharing service or the like, other passengers 4 may already be riding in the vehicles 2. In this case, for example, the server 30 may select, from the retrieved at least one vehicle 2, a vehicle 2 containing other passengers 4 who are travelling to a destination that is in the same direction as the destination of the user 4b.

Upon receiving the dispatch command from the server 30, the automatic driving control module 21 of the vehicle 2 moves the vehicle 2 to the present location of the user 4b, which is received together with the dispatch command (step S203).

When the user 4b enters the dispatched vehicle 2, the automatic driving control module 21 of the vehicle 2 detects the entry of the user 4b into the vehicle 2 by, for example, an opening and closing operation of a door of the vehicle 2, and informs the server 30 as such (step S204). The user 4b himself or herself, instead of the automatic driving control module 21 of the vehicle 2, may inform the server 30 of his or her entry into the vehicle 2 by operation of the mobile terminal 40.

Upon receiving confirmation that the user 4b has entered the vehicle 2, the server 30 generates a driving route from the present location of the vehicle 2 to the destination of the user 4b. Alternatively, for example, a car navigation system of the vehicle 2 may generate a driving route based on information regarding the present location and destination of the user 4b, which is received together with the dispatch command. Note that, when the vehicle 2 offers a ride sharing service, a driving route from the present location of the vehicle 2 to the nearest destination, from among the destinations of the other passengers 4 already riding in the vehicle 2 and the destination of the user 4b, is generated.

The server 30 sends the driving route to the automatic driving control module 21 of the vehicle 2, as necessary, and commands the automatic driving control module 21 of the vehicle 2 to perform automatic driving along the driving route (step S205). The automatic driving control module 21 of the vehicle 2 thereby starts the automatic driving of the vehicle 2 to the destination along the driving route (step S206).

The user 4b who is riding in the vehicle 2 is hereinafter referred to as a passenger 4. While the automatic driving control module 21 is driving the vehicle 2 automatically, the server 30 estimates an expected arrival time when the vehicle 2 is expected to arrive at the destination of the passenger 4, based on information regarding the present location of the vehicle 2, which is regularly sent from the vehicle 2. Note that, for example, the car navigation system of the vehicle 2, instead of a communication control unit 304, may estimate the expected arrival time, and the communication control unit 304 may use the estimated expected arrival time received from the vehicle 2.

The server 30 sends a query to the passenger 4 for evaluating the driving of the vehicle 2 that is under automatic driving control to the vehicle-mounted device 20 of the vehicle 2, a predetermined time (for example, 5 minutes) prior to the expected arrival time when the vehicle 2 is expected to arrive at the destination of the passenger 4 (step S207). The vehicle-mounted device 20 displays the query received from the server 30 on, for example, the touch display of the vehicle-mounted device 20 (step S208). At this time, the communication control unit 304 may collectively send a plurality of queries to be displayed on the vehicle-mounted device 20 as a query list.

The passenger 4 riding in the vehicle 2 views the query displayed on the touch display of the vehicle-mounted device 20, and inputs a reply to the query by operation of the touch display of the vehicle-mounted device 20. The vehicle-mounted device 20 obtains the reply inputted by the passenger 4, and sends the reply to the server 30 (step S209). At this time, the vehicle-mounted device 20 may collectively send a plurality of replies to the server 30 as a reply list.

After the vehicle 2 has arrived at the destination, the automatic driving control module 21 of the vehicle 2 detects that the passenger 4 has exited the vehicle 2 by, for example, an opening and closing operation of the door of the vehicle 2, and informs the server 30 as such (step S210).

When the server 30 does not receive a reply to the query from the vehicle-mounted device 20 before the server 30 receives notification that the passenger 4 has exited the vehicle 2, the server 30 determines that a reply to the query cannot be obtained from the passenger 4. In this case, the server 30 further sends a query to the passenger 4 for evaluating the driving of the vehicle 2 that is under automatic driving control to the mobile terminal 40 carried by the passenger 4 who has exited the vehicle 2 (step S211).

The mobile terminal 40 displays the query received from the server 30 on, for example, the touch display of the mobile terminal 40 (step S212).

The passenger 4 who has exited the vehicle 2 views the query displayed on the touch display of the mobile terminal 40, and inputs a reply to the query by operation of the touch display of the mobile terminal 40. The mobile terminal 40 sends the reply inputted by the passenger 4 to the server 30 (step S213). This facilitates the obtainment of the reply to the query from the passenger 4. Note that, in a case in which a reply is unlikely to be obtained from the passenger 4 even if a query is sent to a passenger 4 who has exited the vehicle 2 in accordance with a reply history of the passenger 4 to queries or the like, steps S211 to S213 may be omitted.

When a reply to the query has not been received from the mobile terminal 40 even when a predetermined time (for example, 2 hours) has elapsed after the query was sent, the server 30 determines that a reply to the query from the passenger 4 has not been obtained. When the server 30 determines that a reply to the query from the passenger 4 has not been obtained, the server 30 may command the mobile terminal 40 to display a message such as "we would appreciate your cooperation with the survey next time."

When the server 30 receives a reply to the query from at least one of the vehicle-mounted device 20 and the mobile terminal 40, the server 30 evaluates the driving of the vehicle 2 that is under automatic driving control, based on the received reply (step S214).

In step S207, the server 30 may send a query for evaluating the driving of the vehicle 2 to the mobile terminal 40 carried by the passenger 4, instead of to the vehicle-mounted device 20 of the vehicle 2. In this case, in steps S208 and S209, the mobile terminal 40 carried by the passenger 4, instead of the vehicle-mounted device 20 of the vehicle 2, displays the received query, and obtains a reply inputted by the passenger 4, and sends the reply to the server 30. In this case, step S211 may be omitted.

Figure 3:
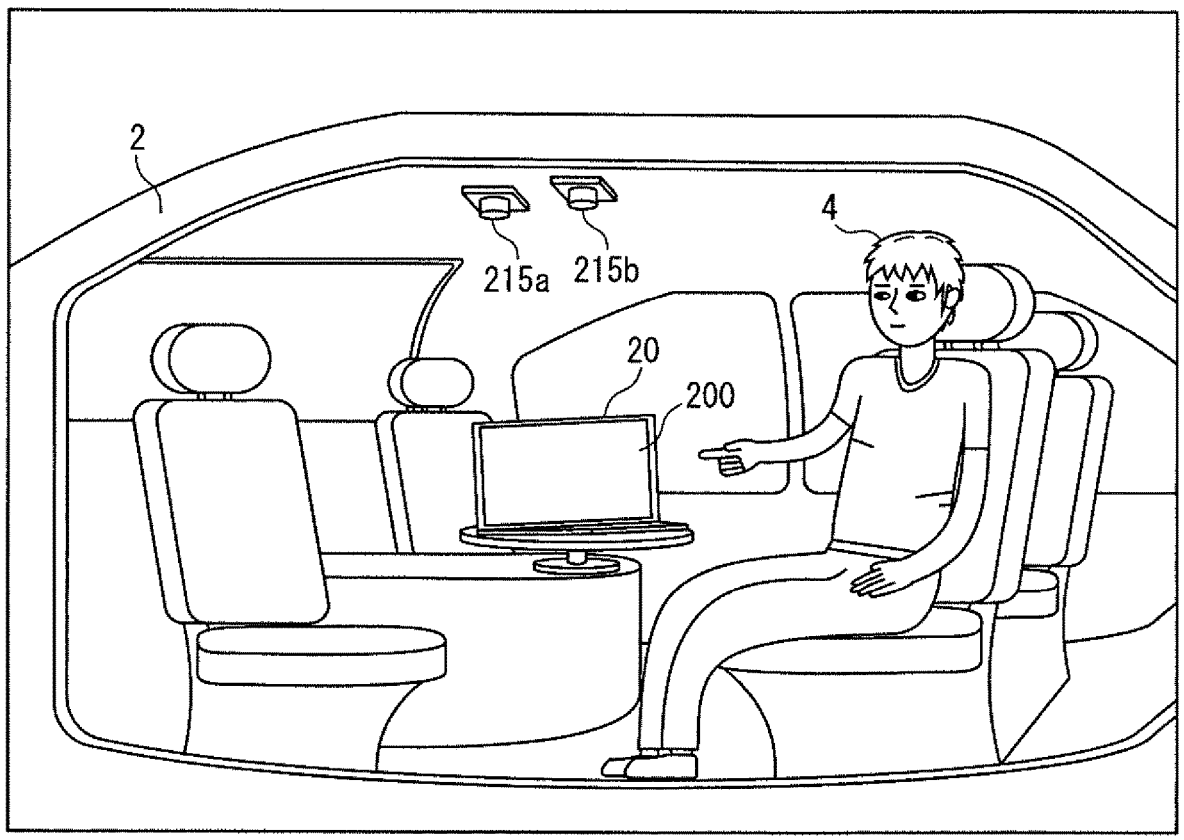
FIG. 3 is a drawing showing an example of a vehicle-mounted device installed in the vehicle according to the first embodiment.

FIG. 3 is a drawing showing an example of the vehicle-mounted device 20 installed in the vehicle 2 according to the first embodiment. In FIG. 3, a plurality of seats are arranged in a compartment of the vehicle 2, and a computer having a touch display 200, which is an example of the vehicle-mounted device 20, is disposed in the middle of the seats. A passenger 4 is sitting in one of the seats and viewing the touch display 200 of the vehicle-mounted device 20.

While the vehicle 2 is automatically driven by the automatic driving control module 21, for example, a driving route from a ride point of the passenger 4 to a destination of the passenger 4 and the like are displayed on the touch display 200 of the vehicle-mounted device 20, together with the present position of the vehicle 2.

Figure 4:
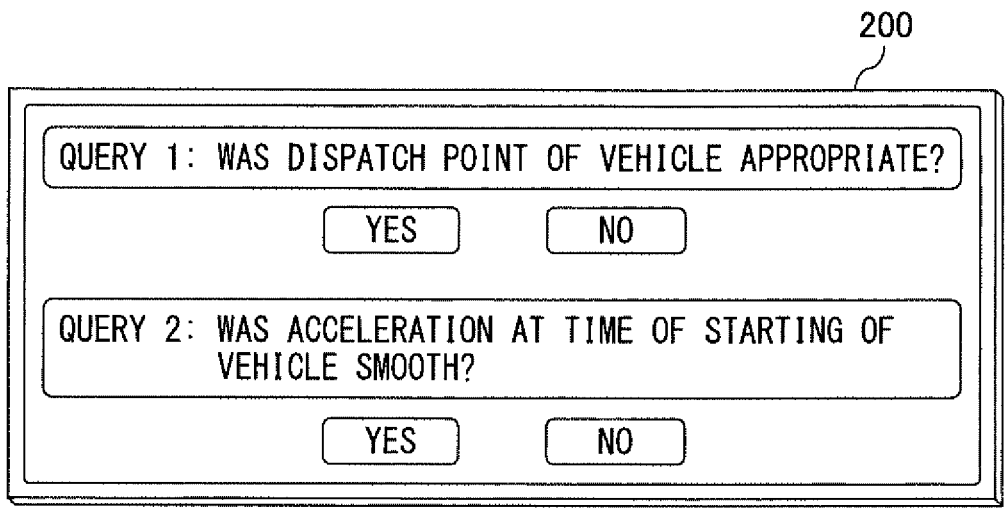
FIG. 4 is a drawing showing an example of queries displayed on a touch display of the vehicle-mounted device according to the first embodiment.

A query to the passenger 4, which is received from the server 30 to evaluate the driving of the vehicle 2, is displayed on the touch display 200 a predetermined time (for example, 5 minutes) prior to an expected arrival time when the vehicle 2 is expected to arrive at the destination of the passenger 4. FIG. 4 is a drawing showing an example of queries displayed on the touch display 200 of the vehicle-mounted device 20 according to the first embodiment. In FIG. 4, two queries are displayed on the touch display 200. Query 1 relates to whether or not a dispatch point of the vehicle 2 was appropriate, and Query 2 relates to whether or not acceleration at the time of starting the vehicle 2 was smooth.

In addition to Queries 1 and 2 shown in FIG. 4, for example, the following Queries 3 to 5 may be displayed on the touch display 200.

Query 3: "Was steering wheel operation at the time of turning smooth?"

Query 4: "Was the vehicle's speed appropriate?"

Query 5: "Were the contents and timing of the announcement to announce the start of the vehicle appropriate?"

The passenger 4 who is riding in the vehicle 2 views the queries displayed on the touch display 200 of the vehicle-mounted device 20, and inputs "Yes" or "No", as replies to the queries, by operation of the touch display 200. The vehicle-mounted device 20 obtains the replies inputted by the passenger 4, and sends the replies to the server 30. Note that, a reply to a query may be a choice among three or more alternatives instead of the alternative of "Yes" or "No", and may further include text inputted by the passenger 4.

Thereafter, when the vehicle 2 has arrived at the destination of the passenger 4, the passenger 4 exits the vehicle 2 by opening and closing a door of the vehicle 2 by, for example, pushing one of exit buttons 215a and 215b disposed in the door of the vehicle 2 or in the vicinity of the door. The vehicle 2 detects that the passenger 4 has exited the vehicle 2 by, for example, the opening and closing operation of the door of the vehicle 2, and informs the server 30 as such. The number of the exit buttons 215a and 215b need not necessarily be two, but may be three or more or may be one.

Figure 5:
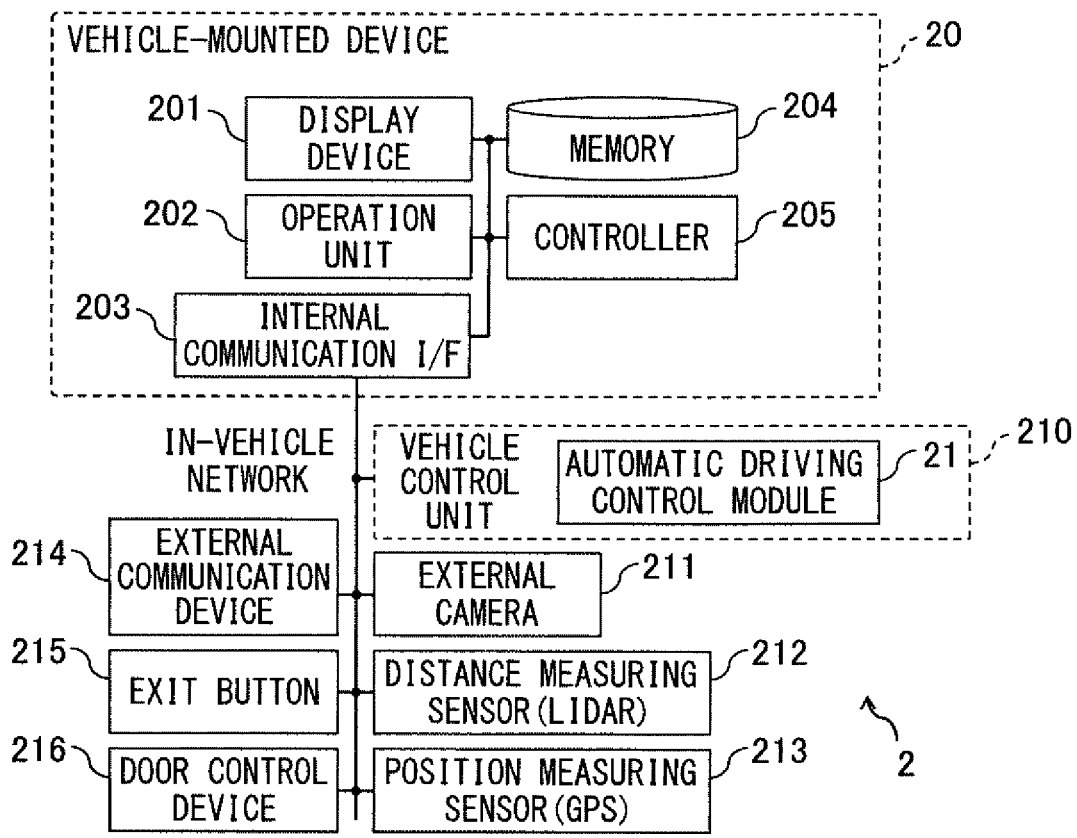
FIG. 5 is a hardware configuration diagram of the vehicle according to the first embodiment.

FIG. 5 is a hardware configuration diagram of the vehicle 2 according to the first embodiment. The vehicle 2 has the vehicle-mounted device 20, a vehicle control unit 210, an external camera 211, a distance measuring sensor 212, a position measuring sensor 213, an external communication device 214, an exit button 215, and a door control device 216 that are connected to each other through an in-vehicle network. The vehicle control unit 210 further has the automatic driving control module 21. The in-vehicle network is, for example, a network that is in conformity with CAN (controller area network) standards.

The vehicle-mounted device 20 has a display device 201, an operation device 202, an internal communication interface (I/F) 203, a memory 204, and a controller 205 that are connected to each other through signal lines. The vehicle-mounted device 20 displays a query received from the server 30 on the display device 201, such as a display. The vehicle-mounted device 20 obtains a reply to the query, inputted by the passenger 4 who has viewed the displayed query by operation of the operation device 202 such as a touch panel, from the operation device 202, and sends the reply to the server 30.

The display device 201 is controlled by the controller 205 so as to display a query to the passenger 4 for evaluating the driving of the vehicle 2 that is under automatic driving control. The operation device 202 is controlled by the controller 205 so as to obtain a reply inputted by the passenger 4 and output the reply to the controller 205. The display device 201 is, for example, a liquid crystal display or an organic EL display. The operation device 202 is, for example, a touch panel, a mouse, a keyboard, or operation buttons. The display device 201 and the operation device 202 may be integrated into, for example, the touch display 200, as shown in FIG. 3.

The internal communication I/F 203 is a communication I/F circuit through which the vehicle-mounted device 20 communicates with other vehicle-mounted devices of the vehicle 2 via the in-vehicle network.

The memory 204 has a recording medium such as an HDD (hard disk drive), an optical recording medium, or a semiconductor memory, and stores computer programs to be executed by the controller 205. The memory 204 stores data generated by the controller 205, data that the controller 205 has received from other vehicle-mounted devices of the vehicle 2 through the in-vehicle network, or the like. The memory 204 may store the contents of queries to be displayed on the display device 201 in association with the identification numbers of the queries. The server 30 can thereby display a desired query by sending an identification number corresponding to the query to the vehicle-mounted device 20, instead of by sending the content of the query to be displayed to the vehicle-mounted device 20, whereby communication traffic from the server 30 to the vehicle-mounted device 20 is reduced.

The controller 205 is one or more processors and peripheral circuits thereof that execute computer programs for control and calculation in the vehicle-mounted device 20. The controller 205 performs a reply obtainment process for obtaining a reply from the passenger 4 to a query for evaluating the driving of the vehicle 2, which will be described later with reference to FIG. 6.

The vehicle control unit 210 has at least one automatic driving control module 21, and controls the accelerator, brake, and steering wheel of the vehicle 2 in accordance with control signals outputted from the automatic driving control module 21. The vehicle control unit 210 transmits signals outputted from the external camera 211, distance measuring sensor 212, and position measuring sensor 213, which are described later, to the automatic driving control module 21.

The automatic driving control module 21 automatically controls the driving of the vehicle 2. The automatic driving control module 21 is configured such that, for example, the performance and function of automatic driving control can be updated. Therefore, the performance and function of the automatic driving control module 21 can be optimized in accordance with the mobility service offered by the vehicle 2. Note that, in applications in which improvements in the performance and function of the automatic driving control module 21 are not particularly necessary, the automatic driving control module 21 need not necessarily be configured so as to be updatable.

The external camera 211 captures and outputs a video of the surroundings of the vehicle 2. The video captured by the external camera 211 is used by the automatic driving control module 21 to automatically control the driving of the vehicle 2. The external camera 211 is disposed near a windshield of the vehicle 2, for example, with an imaging surface thereof facing toward the outside such that people or objects around the vehicle 2 are captured clearly.

The distance measuring sensor 212 measures and outputs distances to objects that are present ahead of the vehicle 2 on an orientation basis. Distance information measured by the distance measuring sensor 212 is used, in the same manner, by the automatic driving control module 21 to automatically control the driving of the vehicle 2. The distance measuring sensor 212 is, for example, a LIDAR (light detection and ranging) installed in the vehicle 2.

The position measuring sensor 213 generates position information that represents the present location of the vehicle 2, and outputs the position information to the vehicle-mounted device 20. The position information generated by the position measuring sensor 213 is used by the automatic driving control module 21 to automatically control the driving of the vehicle 2, and is also sent to the server 30 through the network 5 so that the server 30 can understand the present location of the vehicle 2. The position measuring sensor 213 is, for example, a GPS (global positioning system) of the car navigation system installed in the vehicle 2.

The external communication device 214 is an in-vehicle terminal having a wireless communication function, and is, for example, an in-vehicle navigation system or a DCM (data communication module), as described in the non-patent literature (TOYOTA MOTOR CORPORATION, Mobility Service-specific EV "e-Palette Concept" [retrieved on Aug. 31, 2018], Internet <newsroom.toyota.co.jp/jp/corporate/20508200>). The external communication device 214 is connected to the network 5 through the wireless base station 6, for example, by access to the wireless base station 6, which is connected to the network 5 through a gateway (not illustrated) and the like.

When the passenger 4 exits the vehicle 2, the passenger 4 operates the exit button 215 to open and close the door of the vehicle 2. The exit button 215 is disposed, for example, in the door of the vehicle 2 or in the vicinity of the door, as shown in FIG. 3. The exit button 215 may be an operation button that is displayed as an image on the display device 201 of the vehicle-mounted device 20 or a display device 401 of the mobile terminal 40.

The door control device 216 controls switching between the open and close of the door of the vehicle 2 and between activation and inactivation of the exit button 215, in accordance with signals received from the server 30 through the external communication device 214.

Figure 6:
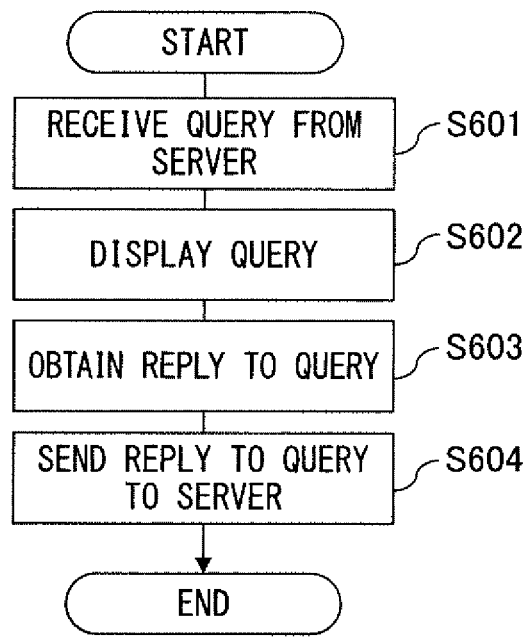
FIG. 6 is a flowchart showing an example of a process for obtaining a reply to a query from a passenger to a query for evaluating the driving of the vehicle in the vehicle-mounted device according to the first embodiment.

FIG. 6 is a flowchart showing an example of the process for obtaining a reply from the passenger 4 to a query for evaluating the driving of the vehicle 2 in the vehicle-mounted device 20 according to the first embodiment. The controller 205 of the vehicle-mounted device 20 performs the process for obtaining a reply from the passenger 4 to a query in accordance with the following flowchart. Descriptions regarding contents that are the same as the sequence diagram of FIG. 2 are omitted.

The controller 205 receives a query for evaluating the driving of the vehicle 2 from the server 30 through the external communication device 214 and the internal communication I/F 203 (step S601). The controller 205 displays the query received from the server 30 on the display device 201 (step S602).

When the passenger 4 who is riding in the vehicle 2 views the query displayed on the display device 201 and inputs a reply to the query by operation of the operation device 202, the controller 205 controls the operation device 202 to obtain the reply inputted by the passenger 4 (step S603). The controller 205 sends the obtained reply to the server 30 through the internal communication I/F 203 and the external communication device 214 (step S604). The controller 205 then ends the reply obtainment process to the query.

Figure 7:
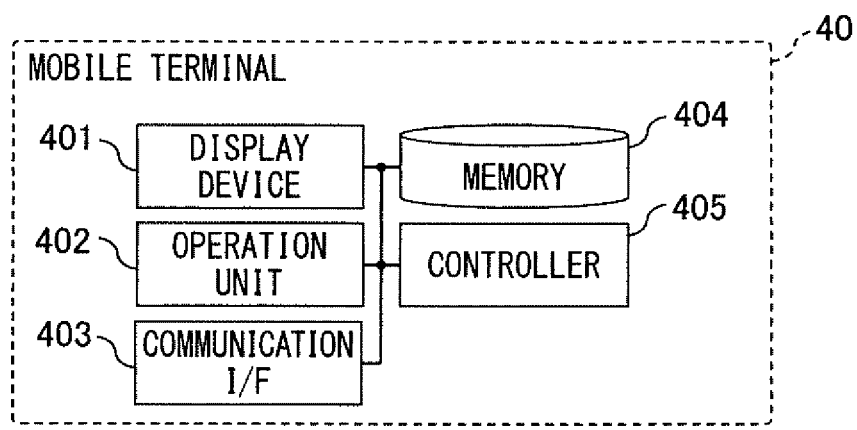
FIG. 7 is a hardware configuration diagram of a mobile terminal according to the first embodiment.

FIG. 7 is a hardware configuration diagram of the mobile terminal 40 according to the first embodiment. The mobile terminal 40 has the display device 401, an operation device 402, a communication I/F 403, a memory 404, and a controller 405. Since the hardware configuration of the mobile terminal 40 is the same as that of the vehicle-mounted device 20 shown in FIG. 5, except for the communication I/F 403, only the communication I/F 403 will be described.

The communication I/F 403 is a communication I/F circuit for connecting the mobile terminal 40 to the network 5 through, for example, a gateway or the like. The communication I/F 403 is configured to be able to communicate with the vehicle-mounted device 20 of the vehicle 2 and the server 30 through the network 5.

As described above, the server 30 may send a query for evaluating the driving of the vehicle 2 to the mobile terminal 40 carried by the passenger 4, instead of to the vehicle-mounted device 20 of the vehicle 2. In this case, the controller 405 of the mobile terminal 40 can perform a process for obtaining a reply from the passenger 4, in the same manner as described above with reference to FIG. 6. As with the touch display 200 illustrated in FIG. 4, the display device 401 and operation device 402 of the mobile terminal 40 can display queries for evaluating the driving of the vehicle 2 and obtain replies inputted by the passenger 4.

Figure 8:
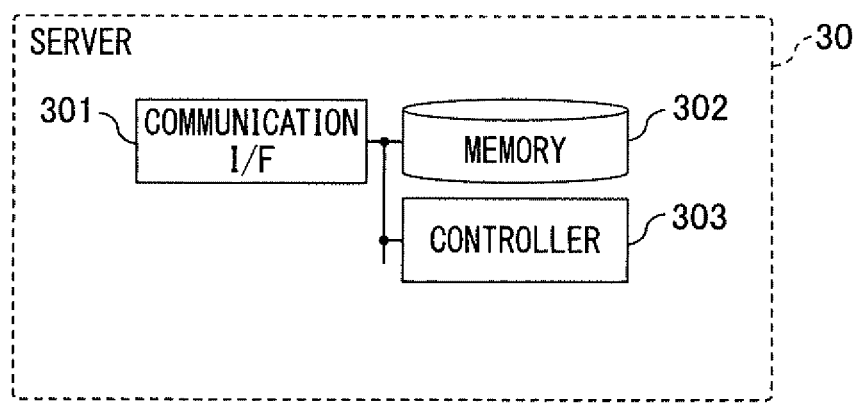
FIG. 8 is a hardware configuration diagram of a server according to the first embodiment.

FIG. 8 is a hardware configuration diagram of the server 30 according to the first embodiment. The server 30 has a communication I/F 301, a memory 302, and a controller 303 that are connected to each other through signal lines.

The communication I/F 301, which is an example of a communication device, is a communication I/F circuit for connecting the server 30 to the network 5 through, for example, a gateway or the like. The communication I/F 301 is configured to be able to communicate with the vehicle-mounted device 20 of the vehicle 2 and the mobile terminal 40 through the network 5.

The memory 302 has a recording medium such as a HDD (hard disk drive), an optical recording medium, or a semiconductor memory, and stores the computer programs executed by the controller 303. The memory 302 stores data generated by the controller 303, data that the controller 303 has received through the network 5, and the like. As an example of information regarding the vehicle 2, the memory 302 stores the type, version, or the like of the automatic driving control module 21 of the vehicle 2. As an example of information regarding the passenger 4, the memory 302 stores a usage history and the like of the vehicle 2 by the passenger 4, in association with the identification information of the passenger 4. The usage history may include, for example, a display history of queries for evaluating the driving of the vehicle 2, which were displayed to the passenger 4 in the past, and the like. The memory 302 stores information about queries for evaluating the driving of the vehicle 2 to be displayed on at least one of the vehicle-mounted device 20 and the mobile terminal 40.

Figure 9:
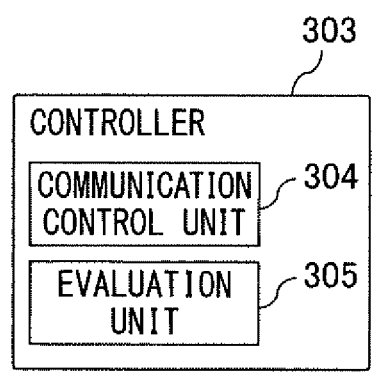
FIG. 9 is a functional block diagram of a controller of the server according to the first embodiment.

FIG. 9 is a functional block diagram of the controller 303 of the server 30 according to the first embodiment. The controller 303 is one or more processors and peripheral circuits thereof that execute computer programs for control and calculation in the server 30. The controller 303 has the communication control unit 304 and an evaluation unit 305. The communication control unit 304 and the evaluation unit 305 are realized as, for example, software modules or firmware to which computer programs are written.

The communication control unit 304 of the controller 303 sends a signal for displaying a query for evaluating the driving of the vehicle 2 on at least one of the vehicle-mounted device 20 and the mobile terminal 40, to at least one of the vehicle-mounted device 20 and the mobile terminal 40 by controlling the communication I/F 301. The communication control unit 304 receives a reply from the passenger 4 to the query from at least one of the vehicle-mounted device 20 and the mobile terminal 40 by controlling the communication I/F 301. A communication control process performed by the communication control unit 304 will be described below.

FIG. 10 is a flowchart showing an example of the communication control process performed by the communication control unit 304 of the server 30 according to the first embodiment. The communication control unit 304 performs a communication control process in accordance with the following flowchart. Descriptions regarding contents that are the same as the sequence diagram of FIG. 2 are omitted.

While the vehicle 2 is automatically driven by the automatic driving control module 21, the communication control unit 304 regularly receives the present location of the vehicle 2 from the vehicle 2. The communication control unit 304 estimates an expected arrival time when the vehicle 2 is expected to arrive at a destination of the passenger 4 based on a driving route from the present location of the vehicle 2 to the destination of the passenger 4 (step S1001).

When the time difference between the present time and the expected arrival time becomes less than a predetermined time, the communication control unit 304 sends a signal for displaying a query for evaluating the driving of the vehicle 2 on the vehicle-mounted device 20 or the mobile terminal 40, to the vehicle-mounted device 20 or the mobile terminal 40 (step S1002). The signal for displaying the query may include the content of the query to be displayed on the vehicle-mounted device 20 or the mobile terminal 40.

The predetermined time is set with sufficient lead time for the passenger 4 to reply the query prior to arrival at the destination, and is set such that the ride time of the passenger 4 becomes long enough to evaluate the ride comfort of the vehicle 2. The predetermined time is preferably set at, for example, 2 minutes to 20 minutes. This facilitates the obtainment of an appropriate reply to the query for evaluating the driving of the vehicle 2 from the passenger 4, even in a case in which, for example, the busy passenger 4 is going to exit the vehicle 2 as soon as the vehicle 2 arrives at the destination.

When the signal for displaying the query is sent to the vehicle-mounted device 20 or the mobile terminal 40, the communication control unit 304 may include the identification number of the query to be displayed, instead of the content of the query to be displayed, in the signal for displaying the query. In this case, the content of the query is stored in advance in the memory 204 of the vehicle-mounted device 20 or the memory 404 of the mobile terminal 40 in association with the identification number of the query. The controller 205 of the vehicle-mounted device 20 or the controller 405 of the mobile terminal 40 reads the content of the query corresponding to the identification number of the query received from the communication control unit 304 from the memory 204 or 404 and displays the query.

The signal for displaying the query for evaluating the driving of the vehicle 2 may be sent in a data format of, for example, HTML (hypertext markup language) or the like including information about a style of displaying the query.

Next, the communication control unit 304 determines whether or not a reply to the query from the passenger 4 has been received from the vehicle-mounted device 20 or the mobile terminal 40 (step S1003). When a reply to the query from the passenger 4 has not been received from the vehicle-mounted device 20 or the mobile terminal 40 (NO in step S1003), the communication control unit 304 determines whether or not notification regarding the exit of the passenger 4 from the vehicle 2 has been received (step S1004). When the notification regarding the exit of the passenger 4 from the vehicle 2 has not been received (NO in step S1004), the communication control unit 304 repeats steps S1003 and S1004.

Conversely, when the notification regarding the exit of the passenger 4 from the vehicle 2 is received before a reply is received from the vehicle-mounted device 20 or the mobile terminal 40 (YES in step S1004), the communication control unit 304 determines that a reply to the query from the passenger 4 has not been obtained. The communication control unit 304 further sends a signal for displaying a query for evaluating the driving of the vehicle 2 on the mobile terminal 40, to the mobile terminal 40 carried by the passenger 4 who has exited the vehicle 2 (step S1005).

Next, the communication control unit 304 determines whether or not a reply to the query from the passenger 4 has been received from the mobile terminal 40 (step S1006). When a reply to the query from the passenger 4 is not received from the mobile terminal 40 (NO in step S1006), the communication control unit 304 determines that a reply to the query from the passenger 4 has been not obtained. The communication control unit 304 then ends the communication control process.

Conversely, when a reply to the query from the passenger 4 has been received from the vehicle-mounted device 20 or the mobile terminal 40 (YES in step S1003 or YES in step S1006), the communication control unit 304 stores the received reply in the memory 302 (step S1007). The communication control unit 304 then ends the communication control process.

The number of queries displayed on the vehicle-mounted device 20 or the mobile terminal 40 preferably does not exceed a predetermined number, so that the passenger 4 is not burdened with replying. The predetermined number is preferably, for example, 1 to 4. The contents of the queries displayed on the vehicle-mounted device 20 or the mobile terminal 40 are preferably changed each time the passenger 4 uses the vehicle 2, for the purpose of obtaining as many replies as possible from the passenger 4. This facilitates the obtainment of replies to the queries for evaluating the driving of the vehicle 2 from the passenger 4.

The communication control unit 304 retrieves a usage history of the vehicle 2 by the passenger 4, which is stored in advance in the memory 302 in association with the identification information of the passenger 4, based on the identification information of the passenger 4 received together with the dispatch request from the mobile terminal 40. The communication control unit 304 selects a query that has been displayed to the passenger 4 less than a predetermined number of times, based on a display history of the queries displayed to the passenger 4 in the past, which is included in the retrieved usage history of the vehicle 2, and displays the query on the vehicle-mounted device 20 or the mobile terminal 40.

The communication control unit 304 may send an alternative query to the vehicle-mounted device 20 or the mobile terminal 40, and may determine a reply to the query from the passenger 4 in accordance with which of a plurality of exit buttons 215 the passenger 4 operates.

For example, when the passenger 4 has exited the vehicle 2 by operating an exit button 215a that is indicated with "YES" of exit buttons 215a and 215b of the vehicle 2, as illustrated in FIG. 3, the communication control unit 304 determines that the passenger 4 has replied "YES" to the query. Conversely, when the passenger 4 has exited the vehicle 2 by operating the exit button 215b that is indicated with "NO", the communication control unit 304 determines that the passenger 4 has replied "NO" to the query. A reply to the query for evaluating the driving of the vehicle 2 can be thereby necessarily obtained from the passenger 4.

In this case, the exit button 215 preferably includes operation buttons that are displayed as an image on the display device 201 of the vehicle-mounted device 20 or the display device 401 of the mobile terminal 40, rather than the physical exit buttons 215a and 215b illustrated in FIG. 3. Therefore, the communication control unit 304 may send a signal for displaying buttons each functioning as both an operation button operated by the passenger 4 to input a reply and an exit button 215 operated by the passenger 4 to open and close the door of the vehicle 2, to the vehicle-mounted device 20 or the mobile terminal 40.

The image of the buttons to be displayed on the vehicle-mounted device 20 or the mobile terminal 40 may be sent from the communication control unit 304 to the vehicle-mounted device 20 or the mobile terminal 40, or may be stored in advance in the memory 204 of the vehicle-mounted device 20 or the memory 404 of the mobile terminal 40. In the latter case, the communication control unit 304 sends the identification numbers of the buttons to be displayed to the vehicle-mounted device 20 or the mobile terminal 40, and the vehicle-mounted device 20 or the mobile terminal 40 reads the image of the buttons corresponding to the received identification numbers from the memory 204 or 404 and displays the image.

The communication control unit 304 may store a result of a reply received from the vehicle-mounted device 20 or the mobile terminal 40 in the memory 302, in association with information about the type or version of the automatic driving control module 21. Therefore, since the evaluation unit 305 evaluates the driving of the vehicle 2, which is under automatic driving control by the automatic driving control module 21, independently from one type or version of the automatic driving control module 21 to another, the performance and function of the automatic driving control module 21 can be easily updated.

When a reply to the query is received from the vehicle-mounted device 20 or the mobile terminal 40, the communication control unit 304 may send a signal for providing a point, which can be used in the next or a subsequent use of the vehicle 2, to a point management server. This facilitates the obtainment of a reply to the query for evaluating the driving of the vehicle 2 from the passenger 4 who will use the vehicle 2 again.

Thereafter, the evaluation unit 305 of the controller 303 statistically processes data of the result of the reply to the query for evaluating the driving of the vehicle 2, which is stored in the memory 302 by the communication control unit 304 each time the passenger 4 uses the vehicle 2, in order to evaluate the driving of the vehicle 2 that is under automatic driving control. Note that, instead of the evaluation unit 305 evaluating the driving of the vehicle 2, for example, a human may evaluate the driving of the vehicle 2 that is under automatic driving control, based on the data of the result of the reply to the query for evaluating the driving of the vehicle 2 stored in the memory 302.

The evaluation unit 305 calculates, for example, the ratio of "YES" (the column A in the table below) as to each query, as shown in the table below, and the arithmetic mean of the calculated ratios of "YES" of all the queries may be calculated as an evaluation value (0.36 in the table below). Alternatively, the evaluation unit 305 may set a weight indicating the degree of importance of each query (the column B in the table below) in advance, and the weighted mean of the ratios of "YES" of individual queries with the weights may be calculated as an evaluation value (0.41 in the table below).

TABLE 1

| | A: ratio of "YES" | B: weight |
|---|---|---|
| Query 1 | 5/10 | 3 |
| Query 2 | 4/10 | 2 |
| Query 3 | 5/10 | 2 |

TABLE 1-continued

|  | A: ratio of "YES" | B: weight |
| --- | --- | --- |
| Query 4 | 4/10 | 2 |
| Query 5 | 0/10 | 1 |
| Evaluation value | 0.36 | 0.41 |

The evaluation value of the driving of the vehicle 2 calculated by the evaluation unit 305 is stored in the memory 302 or sent to another server through the communication I/F 301, and is used as evaluation information to update the performance and function of the automatic driving control module 21.

As described above, the driving evaluation apparatus according to the present embodiment includes the communication device that is configured to be able to communicate through the network with at least one of the vehicle-mounted device installed in the vehicle that is under automatic driving control and the mobile terminal of the passenger who is riding in the vehicle. The driving evaluation apparatus sends the signal for displaying a query for evaluating the driving of the vehicle on at least one of the vehicle-mounted device and the mobile terminal, to at least one of the vehicle-mounted device and the mobile terminal, by the control of the communication device. The driving evaluation apparatus receives a reply to the query from the passenger from at least one of the vehicle-mounted device and the mobile terminal, by the control of the communication device.

Therefore, even in an automatic driving vehicle in which crew members are absent, the driving evaluation apparatus according to the present embodiment can provide a query for evaluating the driving of the vehicle to the passenger riding in the vehicle, and obtain a reply to the query from the passenger, so the driving of the vehicle that is under automatic driving control can be evaluated based on the ride comfort of the vehicle experienced by the passenger.

The above embodiment is merely a practical example of embodiment of the present invention, and the technical scope of the present invention is not limited thereby. The present invention can be carried out in various forms without departing from the technical principles or major features thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A driving evaluation apparatus comprising:
a communication device configured to be able to communicate through a network with at least one of a vehicle-mounted device installed in a vehicle that is under automatic driving control and a mobile terminal of a passenger who is riding in the vehicle; and
a processor configured to send a signal for displaying a query for evaluating the driving of the vehicle on at least one of the vehicle-mounted device and the mobile terminal to at least one of the vehicle-mounted device and the mobile terminal by controlling the communication device, and receive a reply to the query from the passenger from at least one of the vehicle-mounted device and the mobile terminal by controlling the communication device,
wherein the processor estimates an expected arrival time when the vehicle is expected to arrive at a destination of the passenger based on a driving route from the present location of the vehicle to the destination of the passenger, and when a time difference between the present time and the expected arrival time becomes less than a predetermined time, the processor sends the signal for displaying the query for evaluating the driving of the vehicle to at least one of the vehicle-mounted device and the mobile terminal.

2. The driving evaluation apparatus according to claim 1, wherein the processor sends the signal for displaying the query to the vehicle-mounted device, and when the processor receives notification that the passenger has exited the vehicle prior to receiving a reply from the vehicle-mounted device, the processor further sends a signal for displaying the query to the mobile terminal.

3. The driving evaluation apparatus according to claim 1, wherein the processor sends a signal for displaying buttons each functioning as both an operation button operated by the passenger to input the reply and an exit button operated by the passenger to open and close a door of the vehicle on at least one of the vehicle-mounted device and the mobile terminal, to at least one of the vehicle-mounted device and the mobile terminal by controlling the communication device.

4. The driving evaluation apparatus according to claim 1, further comprising:
a memory; wherein
the processor stores the reply in the memory in association with information regarding the type or version of an automatic driving control module that is installed in the vehicle and performs automatic driving control on the vehicle.

5. The driving evaluation apparatus according to claim 1, wherein the processor sends a signal for displaying queries to at least one of the vehicle-mounted device and the mobile terminal such that, each time the passenger uses the vehicle, different queries the number of which does not exceed a predetermined number are displayed.

6. A driving evaluation system comprising a server and at least one of a vehicle-mounted device and a mobile terminal, wherein
the server is configured to be able to communicate through a network with at least one of the vehicle-mounted device installed in a vehicle that is under automatic driving control and the mobile terminal of a passenger who is riding in the vehicle, and the server sends a signal for displaying a query for evaluating the driving of the vehicle on at least one of the vehicle-mounted device and the mobile terminal to at least one of the vehicle-mounted device and the mobile terminal, and receives a reply to the query from the passenger from at least one of the vehicle-mounted device and the mobile terminal, and
upon receiving the signal for displaying the query from the server, at least one of the vehicle-mounted device and the mobile terminal displays the query included in the signal or the query stored in advance in a memory in association with an identification number of the query included in the signal on a display device, and sends the reply to the query, inputted by the passenger, to the server, wherein the server estimates an expected arrival time when the vehicle is expected to arrive at a destination of the passenger based on a driving route from the present location of the vehicle to the destination of the passenger, and when a time difference between the present time and the expected arrival time becomes less than a predetermined time, the server sends the signal for displaying the query for evaluating the driving of the vehicle to at least one of the vehicle-mounted device and the mobile terminal.

7. A driving evaluation method comprising:

by controlling a communication device that is configured to be able to communicate through a network with at least one of a vehicle-mounted device installed in a vehicle that is under automatic driving control and a mobile terminal of a passenger who is riding in the vehicle, sending a signal for displaying a query for evaluating the driving of the vehicle on at least one of the vehicle-mounted device and the mobile terminal to at least one of the vehicle-mounted device and the mobile terminal, and receiving a reply to the query from the passenger from the at least one of the vehicle-mounted device and the mobile terminal, estimating an expected arrival time when the vehicle is expected to arrive at a destination of the passenger based on a driving route from the present location of the vehicle to the destination of the passenger, and when a time difference between the present time and the expected arrival time becomes less than a predetermined time, sending the signal for displaying the query for evaluating the driving of the vehicle to at least one of the vehicle-mounted device and the mobile terminal.

* * * * *